United States Patent [19]
Cook et al.

[11] Patent Number: 5,802,309
[45] Date of Patent: Sep. 1, 1998

[54] METHOD FOR ENCODING SNMP SUMMARY OBJECTS

[75] Inventors: John Cook, Southborough; Kathryn de Graaf, Northborough, both of Mass.; Shay Leshkowitz, Rehovot, Israel; Paul Greizerstein, Hopkinton, Mass.

[73] Assignee: 3Com Corporation, Santa Clara, Calif.

[21] Appl. No.: 662,350

[22] Filed: Jun. 12, 1996

[51] Int. Cl.⁶ .................................................. G06F 17/00
[52] U.S. Cl. ............................ 395/200.62; 395/200.54
[58] Field of Search .................... 395/200.62, 200.53, 395/200.54, 182.01, 200.46, 500; 340/825.35, 825.49

[56] References Cited

U.S. PATENT DOCUMENTS

| | | |
|---|---|---|
| 5,291,583 | 3/1994 | Bapat ...................................... 395/500 |
| 5,572,195 | 11/1996 | Heller et al. ......................... 340/825.35 |
| 5,684,945 | 11/1997 | Chen et al. ............................ 395/182.01 |
| 5,706,440 | 1/1998 | Compliment et al. ............... 395/200.54 |

*Primary Examiner*—Ellis B. Ramirez
*Attorney, Agent, or Firm*—McGlew and Tuttle

[57] ABSTRACT

Data between two stations is often transmitted in the form of a parameter and the name or identifier of the parameter. The present invention divides the identifier into a prefix, an attribute, and a suffix. The actual parameters having a particular prefix or suffix are then transmitted along with the attributes. Then parameters having a different suffix but the same prefix are transmitted along with the respective attributes. This is repeated until all suffixes of the first prefix have been used. The process is then repeated for a different prefix. Indicators are used to indicate the start of a particular group having a particular suffix and a particular prefix. In this way the entire identifier for each parameter does not need to be transmitted each time a parameter is transmitted.

22 Claims, 9 Drawing Sheets

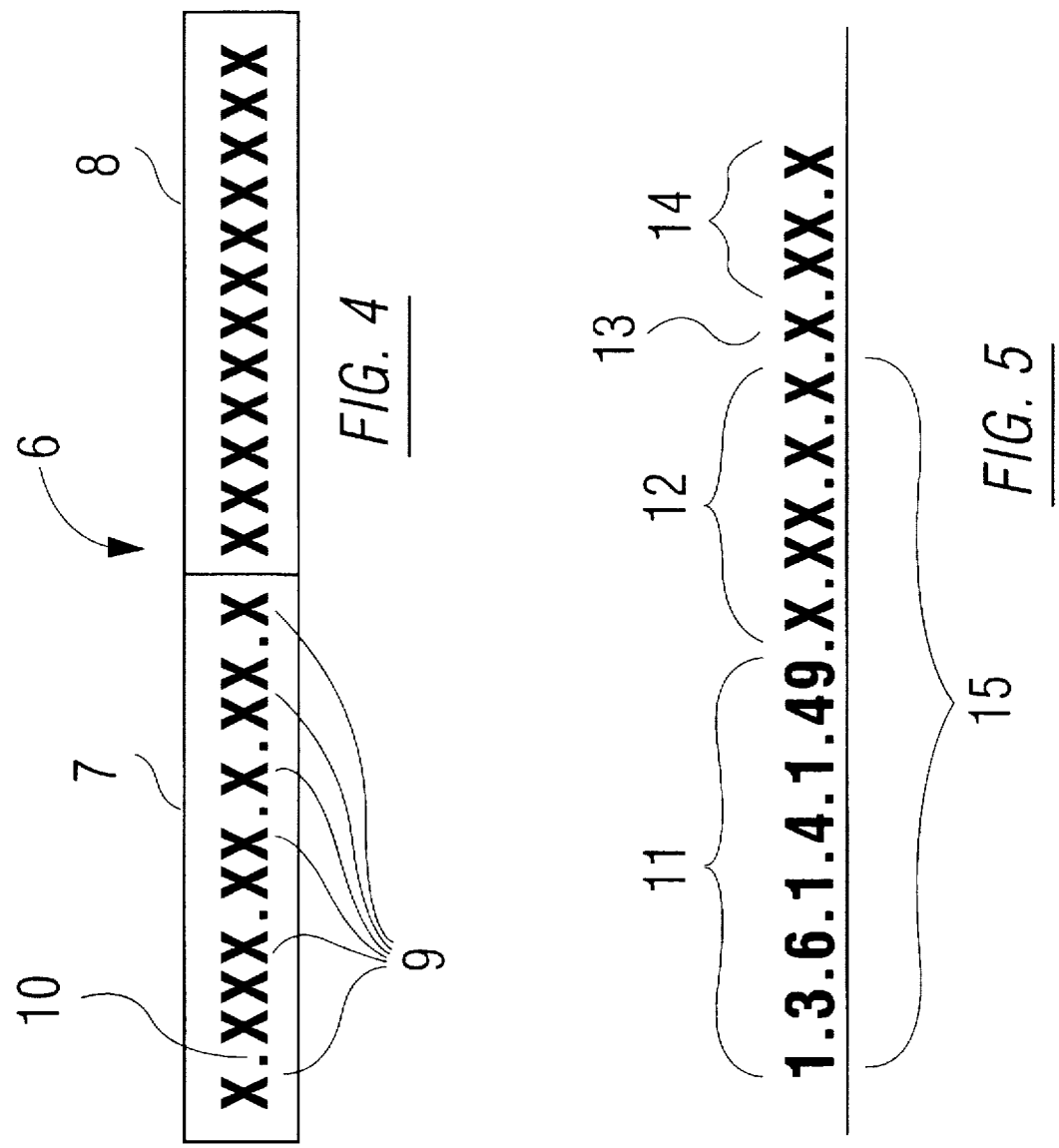

| | | | |
|---|---|---|---|
| PREFIX1 . | ATTRIBUTE1 . | SUFFIX1 . | DATA(A) ↓ 6 |
| PREFIX1 . | ATTRIBUTE2 . | SUFFIX1 . | DATA(B) ↓ 6 |
| PREFIX1 . | ATTRIBUTE3 . | SUFFIX1 . | DATA(C) ↓ . |
| PREFIX1 . | ATTRIBUTE4 . | SUFFIX1 . | DATA(D) ↓ . |
| PREFIX1 . | ATTRIBUTE5 . | SUFFIX1 . | DATA(E) ↓ . |
| PREFIX2 . | ATTRIBUTE1 . | SUFFIX1 . | DATA(F) ↓ . |
| PREFIX2 . | ATTRIBUTE2 . | SUFFIX1 . | DATA(G) ↓ . |
| PREFIX2 . | ATTRIBUTE3 . | SUFFIX1 . | DATA(H) ↓ . |
| PREFIX2 . | ATTRIBUTE1 . | SUFFIX2 . | DATA(I) ↓ . |
| PREFIX2 . | ATTRIBUTE2 . | SUFFIX2 . | DATA(J) ↓ . |
| PREFIX3 . | ATTRIBUTE1 . | SUFFIX1 . | DATA(K) ↓ . |
| PREFIX3 . | ATTRIBUTE1 . | SUFFIX2 . | DATA(L) ↓ . |
| PREFIX3 . | ATTRIBUTE1 . | SUFFIX3 . | DATA(M) ↓ . |
| PREFIX3 . | ATTRIBUTE2 . | SUFFIX1 . | DATA(N) ↓ . |
| PREFIX3 . | ATTRIBUTE2 . | SUFFIX2 . | DATA(O) ↓ . |
| PREFIX4 . | ATTRIBUTE1 . | SUFFIX2 . | DATA(P) ↓ . |

FIGURE 6

PREFIX1 . SUFFIX1 . ATTRIBUTE1 . DATA(A) . ATTRIBUTE2 .
DATA(B) . ATTRIBUTE3 . DATA(C) . ATTRIBUTE4 . DATA(D) .
ATTRIBUTE5 . DATA(E) . PREFIX2 . SUFFIX1 . ATTRIBUTE1 .
DATA(F) . ATTRIBUTE2 . DATA(G) . ATTRIBUTE3 . DATA(H) .
SUFFIX2 . ATTRIBUTE1 . DATA(I) . ATTRIBUTE2 . DATA(J) .
PREFIX3 . SUFFIX1 . ATTRIBUTE1 . DATA(K) . ATTRIBUTE2 .
DATA(N) . SUFFIX2 . ATTRIBUTE1 . DATA(L) . SUFFIX2 .
ATTRIBUTE2 . DATA(O) . SUFFIX3 . ATTRIBUTE1 . DATA(M) .
PREFIX4 . SUFFIX2 . ATTRIBUTE1 . DATA(P)

FIGURE 7

METHOD FOR ENCODING SNMP SUMMARY OBJECTS

FIELD OF THE INVENTION

The present invention relates in general to a method and apparatus for compressing digital information, and in particular, to compressing digital information between a workstation and a management agent of a computer network where the information is primarily variables or parameters of the system operating in the network management agent, and where each variable includes an object identifier and a data portion.

BACKGROUND OF THE INVENTION

Computer networks connect a plurality of individual computers which are usually called stations. These stations are usually connected by a form of cabling to a concentrator which organizes and manages communication between each of the stations. Concentrators such as those described in U.S. Pat. No. 5,303,266 (which is hereby incorporated by reference) have a plurality of slots. In these slots, many different types of modules can be inserted. Media modules are inserted and have ports that are used to connect cabling from the stations to the media module. The media module is then connected to the concentrator backplane or backplanes. Several different media modules can be connected to a concentrator to connect a large number of stations to the concentrator, or to connect different types of cabling such as twisted pair, coax and fiber optic cable to the concentrator. Each media module can be dedicated to one type of cabling. The media module can also contain bridge and router modules for linking together several networks or several concentrators. A concentrator also has a management agent which manages communication between the modules and which can also manage communication between the ports of a module which are connected to the cabling of each station.

The concentrators are normally placed in wiring closets to which all of the cabling is guided in a building. Very often it is necessary for a network operator or supervisor to determine the status of the network, determine flaws in the network and to reconfigure the network. This requires that the operation of the management agent be viewable and changeable so that a human operator or supervisor can monitor and alter the management agent. However it is often not very practical to connect a monitor and keyboard directly to the management agent in the concentrator. The human operator or supervisor usually has a separate computer, at a location distant from the concentrator, and communicates with the management agent in the concentrator using a protocol very similar to the way other stations on the network communicate with each other, except that the operator's workstation communicates with the management agent in the concentrator.

Many management agents operate in a very independent manner. The management agents are somewhat like a self-contained system which operates based on how parameters or variables of the system have been configured. The human operator or supervisor determines the status of the network by reviewing the actual values of the variables. The operator then modifies the network operation by modifying the variables. As the size of computer networks increase, and as computer networks are desired to be more configurable to adapt to changing situations, the amount of information that must be passed back and forth between the management agent and the concentrator and the workstation of the network supervisor increases tremendously. This consumes valuable band width which could otherwise be used between other individual stations on the network. This tends to slow the network down.

SUMMARY AND OBJECTS OF THE INVENTION

It is an object of the present invention to encode a plurality of Management Information Base (MIB) objects each containing a variable or parameter into a single compact MIB object using Abstract Syntax Notation 1 (ASN.1) encoding. ASN.1 is defined by the International Standards Organization (ISO) 8824 and is available through the American National Standards Institute (ANSI) in New York. ASN.1 is also defined by CCITT Standard X.208 now known as ITU (International Telecommunication Union) Recommendation X.208—Specification of Abstract Syntax Notation One (ASN.1) and is available from ITU, Geneva, Switzerland. Both of these Standards are incorporated herein by reference. The purpose of the encoding is to reduce the amount of actual digital data that needs to be transmitted between a workstation and a management entity of a computer network.

The present invention accomplishes this by removing redundancy in the object identifier of a Simple Network Management Protocol (SNMP) variable. Each SNMP variable contains an object identifier which indicates or identifies the parameter which is being transmitted, and a data portion containing the actual value of the parameter. The object identifier includes a plurality of subidentifiers. An initial set of sub-identifiers are considered a prefix, followed by an attribute identifier, and ending with a suffix group of sub-identifiers. The present invention combines the data portions of each variable to be transmitted into a single summary variable where the prefix and suffix do not need to be repeated for each individual data portion. Instead, the prefix is indicated in the summary variable, and then a suffix is indicated, and then all the data portions having that prefix or suffix are included, along with indications for the corresponding attribute of the data portion. Once all data portions made in this criteria are included, data portions of variables having the same prefix but a different suffix are included in the same manner. This is continued until all the suffixes of the initial prefix are processed. Then the next prefix is processed in a manner similar to the initial prefix.

The present invention has the advantage that both MIB object and type identification are encoded as well as data values. The present invention also has an advantage over standard SNMP (get) and (set) requests in that it reduces the amount of information that is sent over relatively slow communication mediums in favor of additional processing time. The advantage of this invention over the SNMP (get-bulk) request is that it organizes MIB tables by rows rather than columns and provides a means of avoiding the transport of large quantities of uninteresting or redundant data. In addition the present invention allows several MIB objects to be compressed into a single MIB object by a means that is standard based.

The encoding scheme of the present invention can also be used to define the contents of a dynamic summary variable. By specifying the value of each datum with a NULL, the structure could be stored in the agent and used to define the format of future requests.

The same methods and structure used to encode and decode in SNMP communications could be used in other applications, for example it could be used to consistently store MIB images on either an agent or a management station.

Mid-level management entities can be used to further decrease network band width used by network management applications, by performing local and/or device specific polling of the agents being managed and then acting as a filter for the information before the information is passed on to a management station. In such a case, a mid-level manager could collect many summary encodings and encode them into a composite summary using this technique.

SNMP provides a means of getting many values, but the data is not organized and each object's object identifier is represented in the request. The get-bulk Protocol Data Unit (PDU) of SNMP provides a means for collecting complete rows in a table, but it is different from the method described here in that it does not provide the flexibility to skip attributes and rows that are not interesting.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 is a view of an SNMP variable;

FIG. 5 is a view of the object identifier of an SNMP variable;

FIG. 6 is a list of raw variables;

FIG. 7 is a summary variable formed from the raw variables shown of FIG. 6;

DETAILED DESCRIPTION OF THE PREFERRED EMBODIMENT

Figure 1:
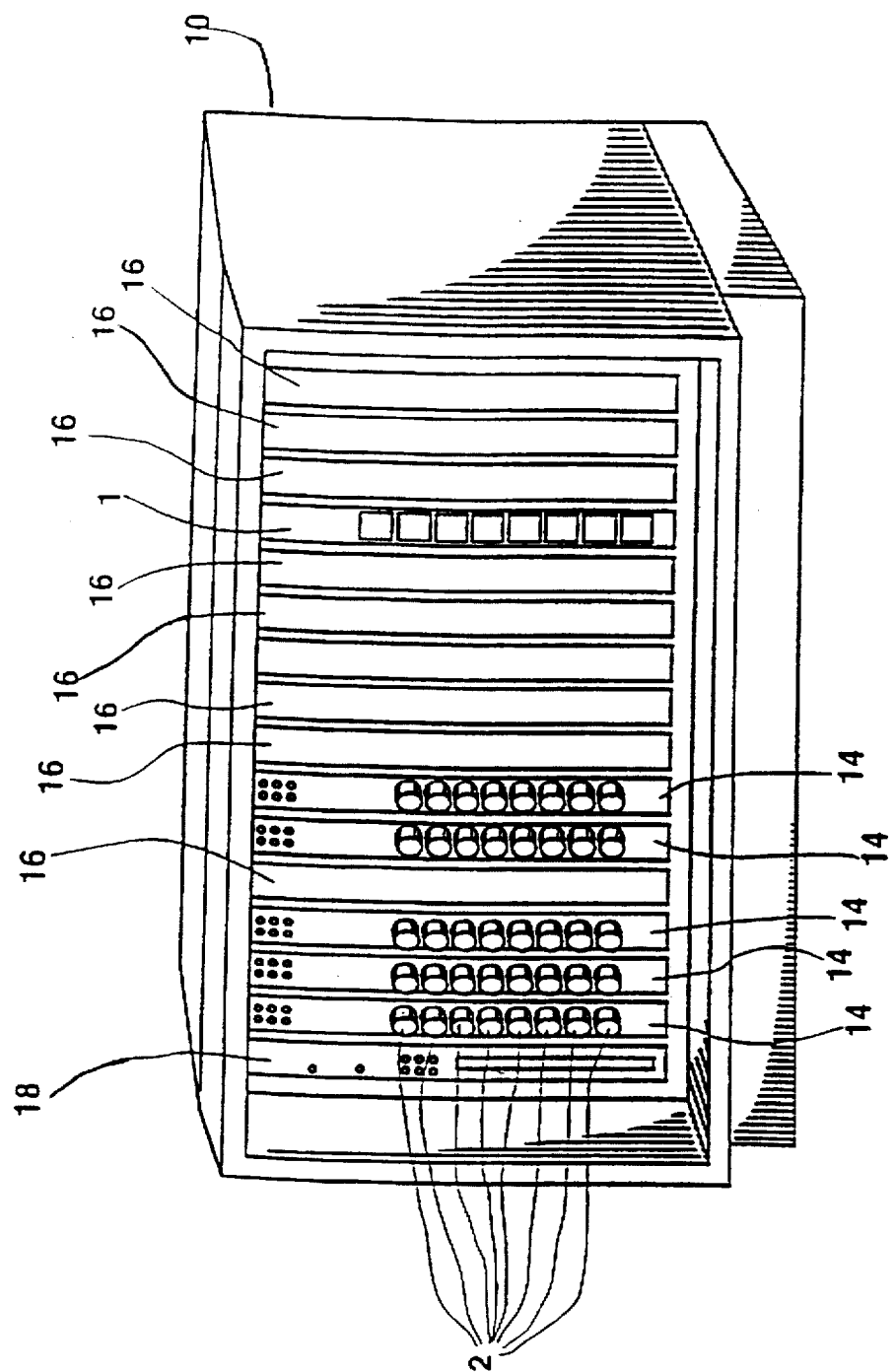
FIG. 1 is a perspective view of a concentrator.
Figure 2:
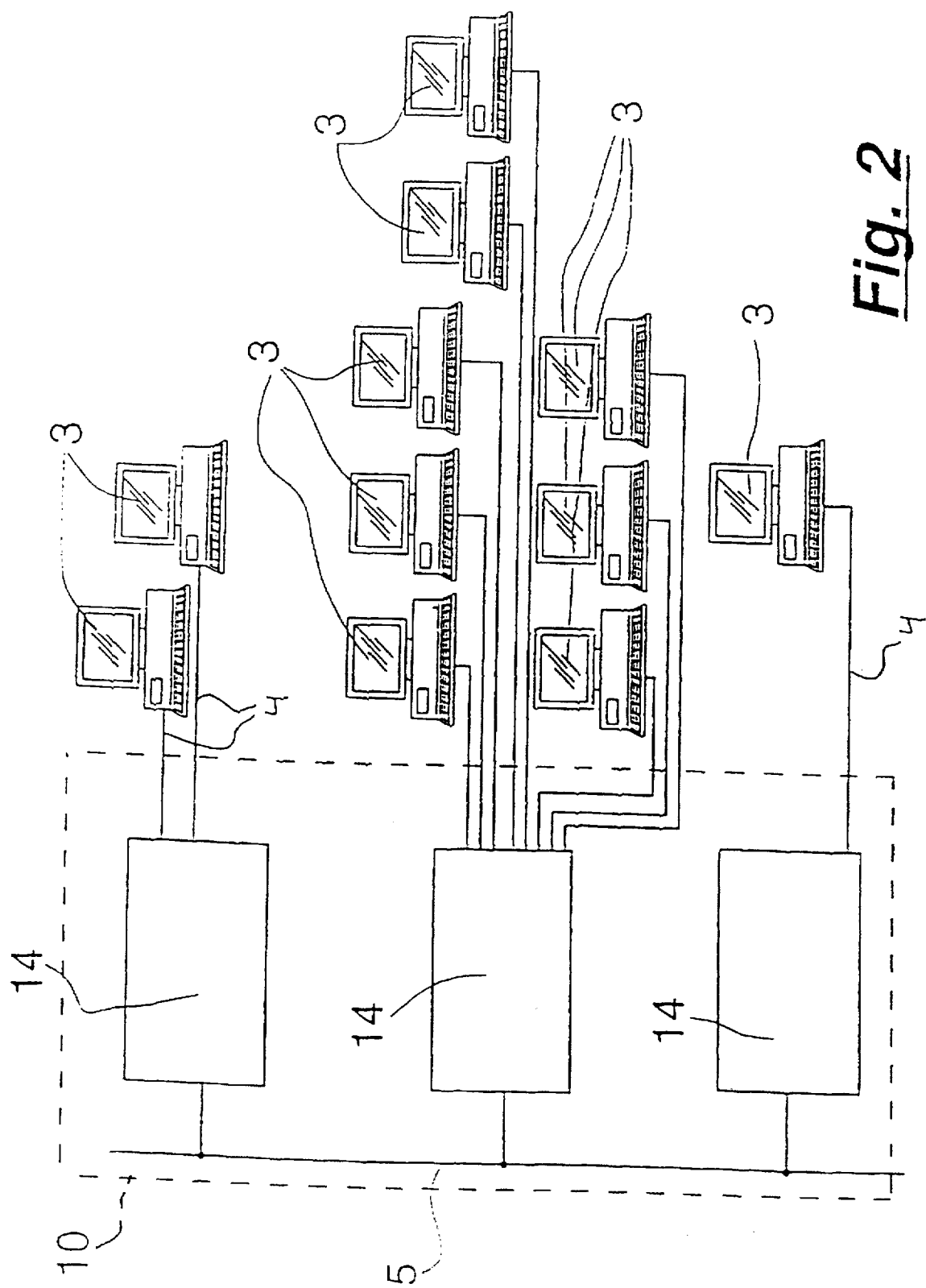
FIG. 2 is a schematic view of a plurality of stations connected to media modules in a concentrator.

Referring to the drawings, especially FIG. 1, a concentrator 10 contains a plurality of media modules 14 and a plurality of empty slots 16 which can be filled with modules. Each of the media modules 14 have a plurality of ports 2. As shown in FIG. 2, a plurality of stations 3 can be connected over lines or lobes 4 to the ports 2 of media modules 14. The concentrator 10 has a backplane 5, of which a portion is shown in FIG. 2. The backplane 5 connects the modules 14 to form a token ring or bus network. If the modules 14 are module-switched media modules, then the stations attached to one of the media modules could form their own network, or form a network with any of the other media modules 14. If the module 14 is a port-switched module, then it would be possible for each station to independently connect to any network on the concentrator or form a network between any group of the stations on the port-switched module. It is also possible to connect a plurality of concentrators to serve more users or to connect two or more networks through bridge or router modules 1. In this way, the modules on several different concentrators can be connected to form a single ring network or users from different networks can be connected.

Figure 3:
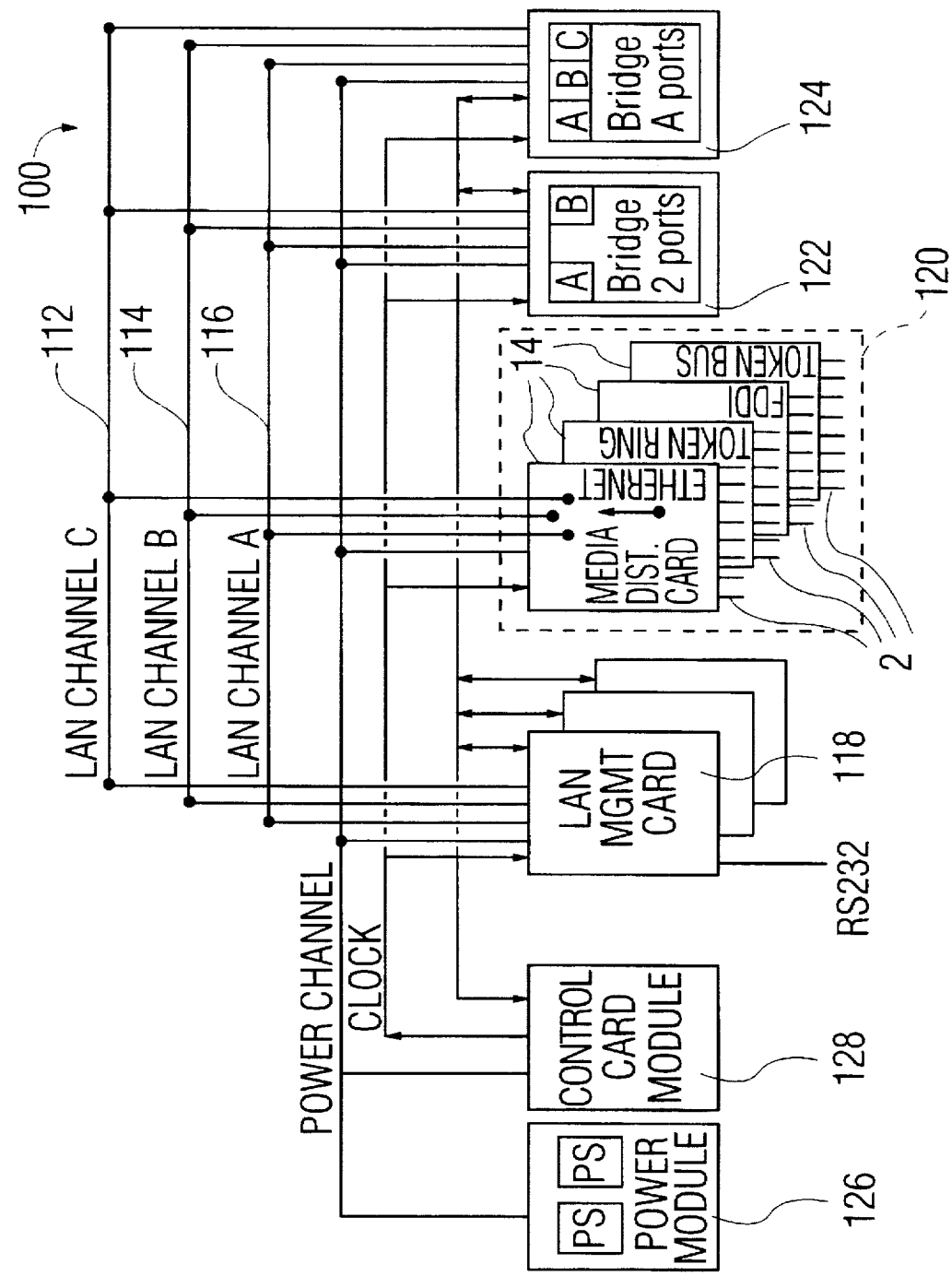
FIG. 3 is a schematic view of the backplane channels and the connections inside a concentrator.

As shown in FIG. 3, a plurality of media modules 14 are shown connected over the backplane. Three channels A, B, and C can be configured (the number of channels or wire/LAN (Local Area Network) groupings can be varied).

A LAN management card 118 contains a network management agent which manages the network. As shown in FIG. 3, several different networks can be present in a concentrator, with each network being on a different set of physical wires of the backplane. Each network can have its own LAN management card 118 with its own network management agent contained on the card.

Many media modules are now being made which allow module switching, where the entire module can switch to one of the networks configured on the backplane, or port switching where each port 2 can be individually connected to the networks configured on the backplane. It is also possible for a media card to create a network just between the stations or ports connected to that media module. The media module 14 can then either have its own intelligent capabilities in order to create its own network management agent for each independent network that is set up or the management agent for the concentrator can separately manage each independent network in a module.

A network management agent, whether it is on a LAN management card 118 or a media module 14, is preferably set up as a system which operates based on a set of parameters. An individual station 3 can review and change the operation of a network management agent by communicating with the agent, if given the proper authorization, through the normal network channels or paths. The individual workstation determines the status of the management agent, by reviewing the parameters of the management agent. A network supervisor or operator can modify the operation of the network by changing the values of the parameters.

The values of these parameters must therefore be transmitted back and forth between the management agent and the authorized workstation. These parameters are transferred between the agent and the authorized workstation according to SNMP as defined by IETF (Internet Engineering Task Force) standard RFC (Request For Comments) 1157 which are available by INTERNET email at mailserv@ds.internic.net. In this standard, the name or object identifier of the parameter is transmitted along with a data portion which contains the value of the parameter. The combination of object identifier and data portion form a variable 6, as shown in FIG. 4 with the object identifier 7 and the data portion 8. The object identifier 7 has a plurality of sub-identifiers 9 which are positioned in between the periods or decimal points 10 in the object identifier 7. The initial sub-identifiers are numerical and are set by various standards bodies of organizations for uniformity in computer networks and compatibility between equipment from different manufacturers. In FIG. 5, the group 11 of sub-identifiers 9 indicates that the variable belongs to a parameter of a particular manufacturer, in this case Chipcom Corporation, a subsidiary of 3COM. A remaining group 12 of sub-identifiers 9 indicate to Chipcom hardware and software, the particular parameter in a corresponding piece of Chipcom equipment. A single sub-identifier 13 is known as an attribute sub-identifier and another group 14 of sub-identifiers which are positioned after the attribute identifier 13 can be used to further identify the variable.

In the present invention, the sub-identifiers from groups 11 and 12 are combined into a prefix or containment group 15.

When prior art systems would transmit a block of variables they would transmit the entire variable 6 for each variable in the block each time that variable was needed or requested. In order to reduce the amount of actual digital words which must be sent back and forth between the workstation and the management agent, the present invention groups together data portions of variables having similar prefixes 15 and suffixes 14. In particular, one of the prefixes 15 of the variables 6 is selected, then one of the suffixes inside this group of the same prefix is selected. All data portions within this suffix or block group are then combined into a summary variable with the attributes of each data portion.

Then all the data portions and attributes of variables inside this group of one prefix, but which have a different suffix, are grouped together and placed in the summary variable next to the first group. This is repeated for all groups of variables having different suffixes in the first prefix group. Then a second prefix from the plurality of prefixes to be transmitted is processed in a manner similar to the variables of the first prefix. Indicators are placed in the summary variable indicating the start of each group of suffixes and the start of each group of prefixes.

FIG. 6 is an example of 16 raw variables which have individual prefixes, attributes and suffixes in common. To transmit these 16 variables would require 64 words. FIG. 7 shows a summary variable formed from the raw variables of FIG. 6. All the data portions that have the same prefix and suffix come after each other. This summary variable has 44 words and could have less if the raw variables were more similar. An example of actual MIB tables (variables) for a particular module is included in appendix A.

This then gives us a summary variable that has many separate and individual objects inside it. The individual objects are maintained separately using BER encoding, and in particular the feature of nested sequences which is known in the art of BER (Basic Encoding Rules) encoding.

Each prefix therefore does not need to be repeated when each variable is transmitted over the network. Instead each specific prefix is only transmitted once and the receiving station or agent knows that all data portions received after the prefix indication have that specific prefix until another prefix indication is received. Correspondingly, in the present invention, each individual suffix does not need to be transmitted for each variable, but instead is only transmitted once through the suffix indicator which indicates that all data portions following the suffix indicator have the same suffix until another suffix indicator is received. The receiver of the summary variable recreates each data portion based on the indicators for the attribute, the suffix and the prefix.

It is also possible to further break down the compression by dividing the prefix and/or suffix into several parts and combining data values of like parts of the prefixes and suffixes. In the present invention the variables are collected into SNMP tables of columns, rows and indexing, which makes the present system advantageous. However, other combinations are possible using the compression method of the present invention.

Figure 8:
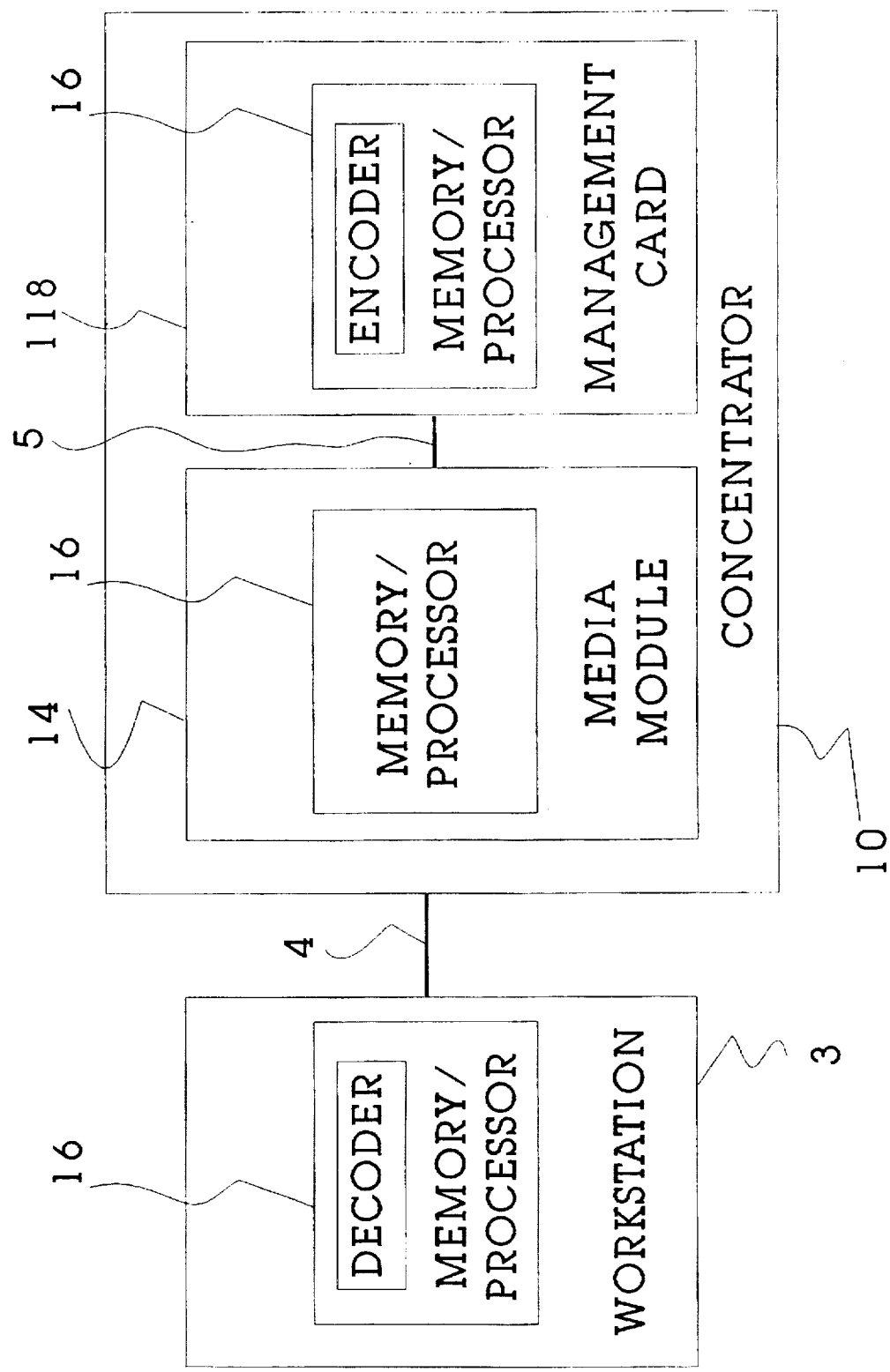
FIG. 8 is a schematic view of the structure for communicating between a workstation and a network module of the present invention.

To create the summary variable, the management card 118, as shown in FIG. 8, includes a memory means and processor means 16 which performs the encoding. The management card 118 is connected to the media module 14 by the backplane 5. The media module 14 can also contain a memory means and processor means 16 if the media module performs any management functions. In the workstation 3 the summary variables are received over the line 4.

The workstation 3 also includes a memory and processor means 16 which performs a decoding function. The decoder function recreates each of the variables from the summary variable and passes the recreated variables to the operator.

The transfer of variables from the workstation to the management agent could be similar if desired. However in the preferred embodiment, most of the data is transferred from the management agent to the workstation and therefore it is easier to use conventional methods for communication from the workstation to the management agent.

Figure 9:
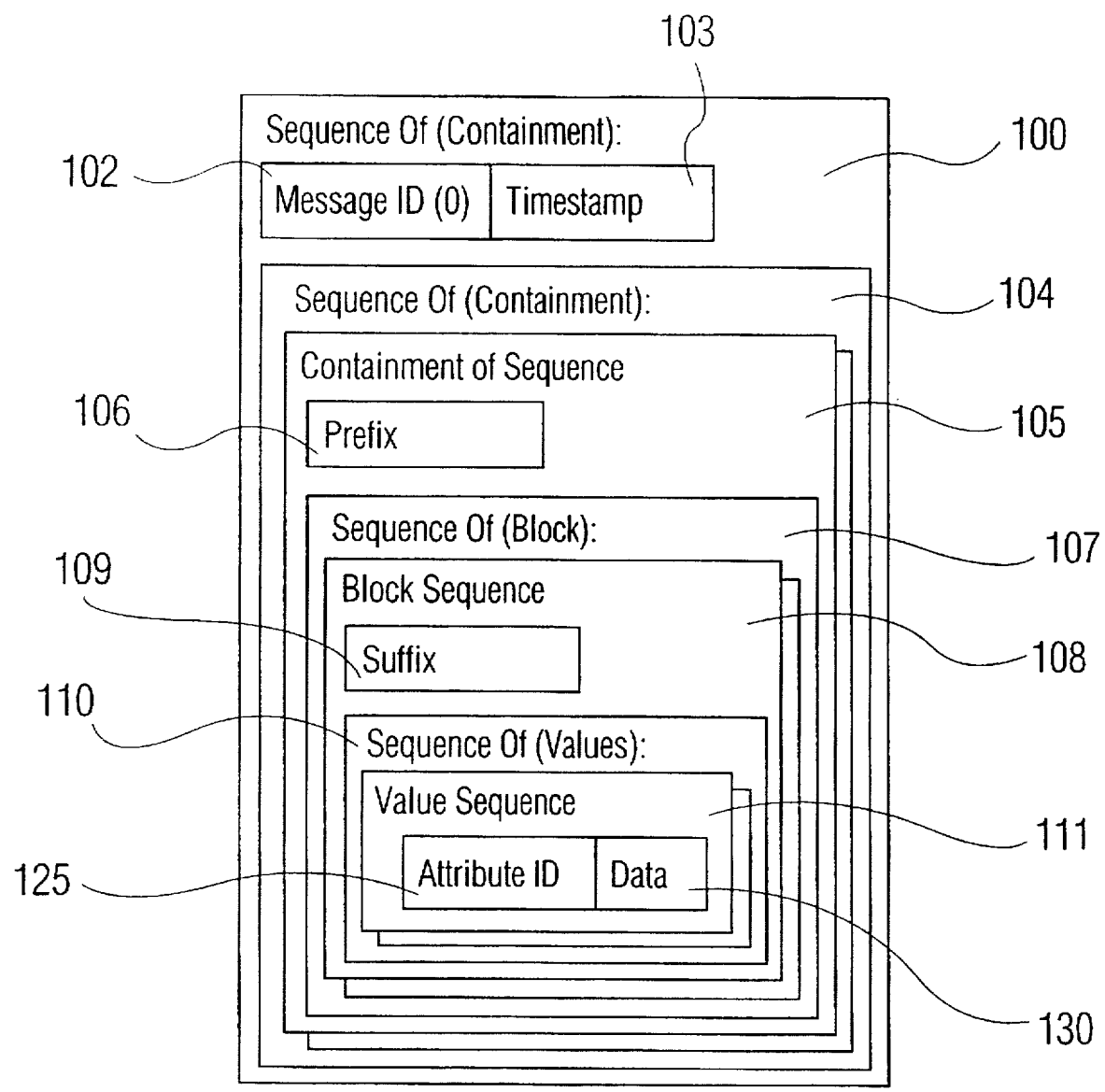
FIG. 9 and 10 are diagrams showing the layout of the data structure of the summary variable of the present invention.
Figure 10:
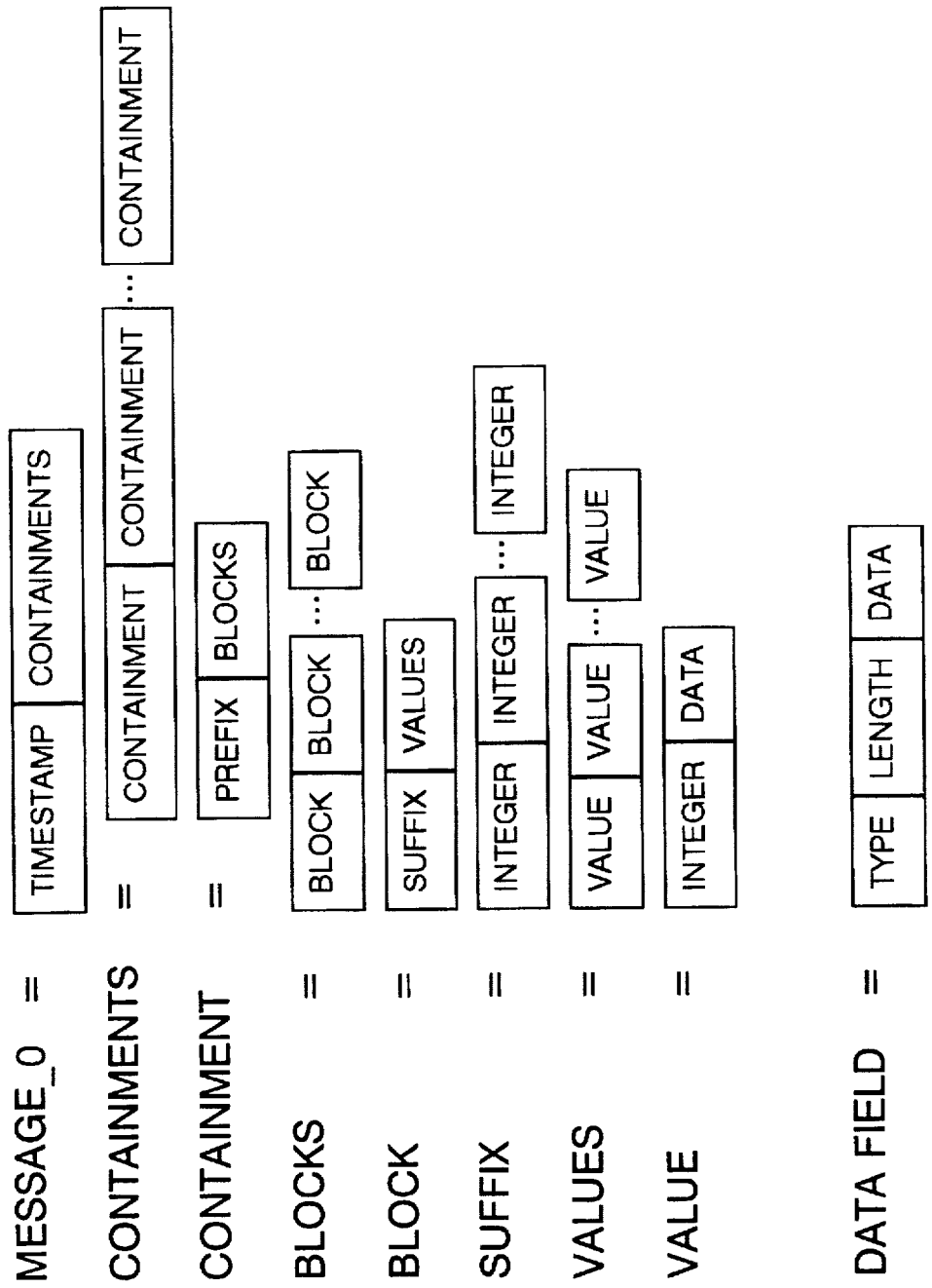

FIGS. 9 and 10 show the layout of the data structure or summary object 100. The summary 100 itself is a sequence of 102 with an implied value of zero. That sequence contains a TimeTick value that represents a time-stamp 103 and a sequence of containment 104. The sequence of containment 104 contains one or many containment sequences 105. Each containment sequence 105 contains a prefix 106 and a sequence of blocks 107. The sequence of blocks contains one or many block sequences 108. Each block sequence contains a suffix 109 and a sequence of values 110. The sequence of values 110 contains one or many value sequences 111. Each value sequence 11 contains one attribute ID 125 and one data value 130.

The data in the object will be encoded using ASN.1 which is a known composed set of standard notation and a set of encoding rules known as BER (Basic Encoding Rules). Each ASN.1 object defined has a type, length and data field. The data field can be composed of other ASN.1 objects. The type field is always one byte. The size of the length field is dependent upon the size of the data. For most integer values the length field will be one byte (value is less than 127). BER will compress the data into as few bytes as possible. For example an INTEGER of value 5 occupies only 3 bytes (including type and length fields) while an INTEGER of value 300 occupies four bytes.

Each summary object must contain at least one containment sequence 105, block sequence 108 and value sequence 111. Otherwise it would contain no data and be meaningless. The prefix 106 represents the Object Identifier (OID) of a table entry or group within the MIB. For the purposes of this document an object group is defined as a collection of scalar MIB objects whose OID's are identical except for the very last component. The suffix 109 identifies the index into the table for a particular object instance (NULL in the case of a group, since instances of the objects within a group are always numbered zero). The attribute ID identifies an attribute within the table identified by the prefix 106 at the index identified by the suffix 109.

Using this scheme, many attributes of many tables for various indices can be encoded into a single request without re-specifying the fully qualified OID for each object.

This encoding works within the constraints of SNMP version one for the GET, SET, GET-NEXT, GET-RESPONSE and TRAP Protocol Data Unit (PDU).

The following is the actual ASN.1 description of the invention:

```
NEW_SUMMARY DEFINITION ::= BEGIN
IMPORTS TimeTicks FROM RFC1155-SMI;
Message ::= CHOICE OF {
    Message_0
}
Message_0 ::= [0] IMPLICIT SEQUENCE {
    timeStamp TimeTicks,
    containments    CONTAINMENTS
```

```
}
CONTAINMENTS ::= SEQUENCE OF CONTAINMENT
CONTAINMENT ::= SEQUENCE {
        prefix OID, -- Base OID
        blocks    BLOCKS
}
BLOCKS ::= SEQUENCE OF BLOCK
BLOCK ::= SEQUENCE {
        suffix SUFFIX,
        values VALUES
}
SUFFIX ::= CHOICE OF {
        SEQUENCE OF INTEGER,    -- Indicies (i.e. slot.port)
        NULL
}
VALUES ::= SEQUENCE OF VALUE
VALUE ::= SEQUENCE {
        attribute    INTEGER,
        data         DATA
}
DATA ::-- CHOICE OF {
        INTEGER,
        OCTET STRING,
        TimeTicks
}
END
```

The following is an example of an MIB object that uses the summary object.

```
ssValues OBJECT-TYPE
    SYNTAX      OCTET STRING
    ACCESS      read-only
    STATUS      mandatory
```

```
DESCRIPTION
    "The OIDs and values of the objects to be summarized, given as
    an octet string in the 'New Summary' format.
    NEW_SUMMARY DEFINITION ::= BEGIN
    IMPORTS TimeTicks FROM RFC1155-SMI;
    Message ::= CHOICE OF {
        timeStamp TimeTicks,
        containments        CONTAINMENTS
    }
    CONTAINMENTS ::= SEQUENCE OF CONTAINMENT
    CONTAINMENT ::= SEQUENCE {
        prefix OID, --Base OID
        blocks    BLOCKS
    }
    BLOCKS ::= SEQUENCE OF BLOCK
    BLOCK ::= SEQUENCE {
        suffix SUFFIX,
        values VALUES
    }
    SUFFIX ::= CHOICE OF {
        SEQUENCE OF INTEGER, -- Indicies (i.e. slot.port)
        NULL
    }
    VALUES ::= SEQUENCE OF VALUE
    VALUE ::= SEQUENCE {
        attribute    INTEGER,
        data         DATA
    }
    END"
::- {staticSummaryEntry 3 }
```

While specific embodiments of the invention have been shown and described in detail to illustrate the application of the principles of the invention, it will be understood that the invention may be embodied otherwise without departing from such principles.

APPENDIX A

```
--
-- ONcore Token Ring Network Monitor Card          Inclusion #4
-- oc62nnDMGTModTable OBJECT-TYPE
        SYNTAX SEQUENCE OF Oc62nnDMGTModEntry
        ACCESS not-accessible
        STATUS mandatory
        DESCRIPTION
                "A table that contains information about Token Ring
                Network Monitor Cards in the ONcore Hub."
        ::= { oc62nnDMGT 6 } oc62nnDMGTModEntry OBJECT-TYPE
        SYNTAX Oc62nnDMGTModEntry
        ACCESS not-accessible
        STATUS mandatory
        DESCRIPTION
                "A list of information for an Token Ring Network Monitor
                Card in the ONcore Hub."
        INDEX { oc62nnDMGTModSlotIndex, oc62nnDMGTModSubSlotIndex}
        ::= { oc62nnDMGTModTable 1 }

Oc62nnDMGTModEntry ::=
        SEQUENCE {
                oc62nnDMGTModSlotIndex
                        INTEGER,
                oc62nnDMGTModSubSlotIndex
                        INTEGER,
                oc62nnDMGTModBootVersion
                        DisplayString,
                oc62nnDMGTModIpAddress
                        IpAddress,
                oc62nnDMGTModSubnetMask
                        IpAddress,
                oc62nnDMGTModDefaultGateway
                        IpAddress,
                oc62nnDMGTModStationAddr
                        MacAddress,
                oc62nnDMGTModInterfaceMode
                        INTEGER,
                oc62nnDMGTModTRAdapterStatus
                        INTEGER,
                oc62nnDMGTModTRMacAddrType
                        INTEGER,
                oc62nnDMGTModTRLocAdminAddr
                        MacAddress,
                oc62nnDMGTModTRChipFlashVer
                        DisplayString,
                oc62nnDMGTModTRChipBufStatus
                        INTEGER,
                oc62nnDMGTModTREarlyTokenRel
                        INTEGER,
                oc62nnDMGTModTRMonitorConten
                        INTEGER,
                oc62nnDMGTModTRInternalWrap
                        INTEGER,
                oc62nnDMGTModTRExternalWrap
                        INTEGER,
                oc62nnDMGTModIfIndex
```

```
        oc62nnDMGTMod              Integer
        oc62nnD⸰ ₒdRMONStatsMode
                INTEGER,
        oc62nnDMGTModDot5StatsMode
                INTEGER,
        oc62nnDMGTModRMONHostStatsMode
                INTEGER,
        oc62nnDMGTModRMONRingStationStatsMode
                INTEGER,
        oc62nnDMGTModRMONMLStatsMode
                INTEGER,
        oc62nnDMGTModRMONPStatsMode
                INTEGER,
        oc62nnDMGTModRMONSrcRoutingStatsMode
                INTEGER,
        oc62nnDMGTModRMONSurrogateStatsMode
                INTEGER,
        oc62nnDMGTModARPResolveMethod
                INTEGER
    } oc62nnDMGTModSlotIndex OBJECT-TYPE
        SYNTAX INTEGER
        ACCESS read-only
        STATUS mandatory
        DESCRIPTION
                "The slot number of this card."
        ::= { oc62nnDMGTModEntry 1 } oc62nnDMGTModSubSlotIndex OBJECT-TYPE
        SYNTAX INTEGER
        ACCESS read-only
        STATUS mandatory
        DESCRIPTION
                "The subslot number of this card."
        ::= { oc62nnDMGTModEntry 2 } oc62nnDMGTModBootVersion OBJECT-TYPE
        SYNTAX DisplayString (SIZE(1..32))
        ACCESS read-only
        STATUS mandatory
        DESCRIPTION
                "The software boot eprom version of this module. "
        ::= { oc62nnDMGTModEntry 3 } oc62nnDMGTModIpAddress OBJECT-TYPE
        SYNTAX IpAddress
        ACCESS read-only
        STATUS mandatory
        DESCRIPTION
                "The current IP address of this card and the associated interface
        ::= { oc62nnDMGTModEntry 4 } oc62nnDMGTModSubnetMask OBJECT-TYPE
        SYNTAX IpAddress
        ACCESS read-only
        STATUS mandatory
        DESCRIPTION
```

"The current subnet mask of this card and the associated interfa[ce]
::= { oc62nnDMGT Entry 5 } oc62nnDMGTModDefaultGateway OBJECT-TYPE
        SYNTAX IpAddress
        ACCESS read-only
        STATUS mandatory
        DESCRIPTION
                "The current default gateway of this card and the associated int[erface].
                Note that a value of 0.0.0.0 indicates that this interface is n[ot]
                configured to be used with a default gateway."
        ::= { oc62nnDMGTModEntry 6 } oc62nnDMGTModStationAddr OBJECT-TYPE
        SYNTAX MacAddress
        ACCESS read-only
        STATUS mandatory
        DESCRIPTION
                "A 6 octet address that uniquely identifies this card.
                This corresponds to the MAC address burned-in during
                manufacture of this module. Note that an address of
                00-00-00-00-00-00 is invalid and the module has failed."
        ::= { oc62nnDMGTModEntry 7 } oc62nnDMGTModInterfaceMode OBJECT-TYPE
        SYNTAX INTEGER {
                enabled(1),
                disabled(2),
                standby(3)
                }
        ACCESS read-write
        STATUS mandatory
        DESCRIPTION
                "The desired connectivity mode of this card. When this
                attribute is set to enabled(1) and the card is set to a
                network, it will forward messages to and from the master
                Distributed Management Module. If this attribute is set
                to disabled(2), the card may still collect statistics but not
                forward messages to and from the Distributed Management Module.
                If this attribute is set to standby(3), the card will not collec[t]
                statistics or forward messages to/from the Distributed Managemen[t]
                Module."
        ::= { oc62nnDMGTModEntry 8 } oc62nnDMGTModTRAdapterStatus OBJECT-TYPE
        SYNTAX INTEGER {
                initializing(1),
                opened(2),
                closed(3),
                opening(4),
                fatal-error(5)
                }
        ACCESS read-only
        STATUS mandatory
        DESCRIPTION
                "The status of the Token Ring Adapter for this module."
        ::= {oc62nnDMGTModEntry 9 } oc62nnDMGTModTRMacAddrType OBJECT-TYPE

```
        SYNTAX INTEGER {
                burned-in(1),
                locally-administered(2)
                }
        ACCESS read-write
        STATUS mandatory
        DESCRIPTION
                "The desired MAC address in use for this agent.
                burned-in(1) indicates that the factory setting as defined
                in oc62nnDMGTStationAddr should be used.
                locally-administered(2) indicates that the MAC address
                set in oc62nnDMGTLocAdminAddr should be used.
                Setting this value to use an invalid MAC address (for
                example, all zeros) will return invalidData error."
        ::= {oc62nnDMGTModEntry 10} oc62nnDMGTModTRLocAdminAddr OBJECT-TYPE
        SYNTAX MacAddress
        ACCESS read-write
        STATUS mandatory
        DESCRIPTION
                "A MAC address with the locally administered bit set to
                one. Setting this value to an invalid address will return
                invalidData error. An invalid address is a value with the
                locally administered bit set to zero, or a value of all ones."
        ::= { oc62nnDMGTModEntry 11 } oc62nnDMGTModTRChipFlashVer OBJECT-TYPE
        SYNTAX DisplayString (SIZE(1..10))
        ACCESS read-only
        STATUS mandatory
        DESCRIPTION
                "The version number of the microcode loaded into the
                module's IBM Token Ring MAC Chip Flash."
        ::= { oc62nnDMGTModEntry 12 } oc62nnDMGTModTRChipBufStatus OBJECT-TYPE
        SYNTAX INTEGER {
                tr-chip-buffer-ok(1),
                tr-chip-buffer-full(2)
                }
        ACCESS read-only
        STATUS deprecated
        DESCRIPTION
                "Indicates whether the IBM Token Ring MAC Chip buffer is ok
                or full. If the buffer is full, the module will stop
                collecting statistics, therefore frames may be dropped."
        ::= { oc62nnDMGTModEntry 13 } oc62nnDMGTModTREarlyTokenRel OBJECT-TYPE
        SYNTAX INTEGER {
                enabled(1),
                disabled(2)
                }
        ACCESS read-write
        STATUS mandatory
        DESCRIPTION
                "Indicates whether Early Token Release is enabled for this
                module's TR adapter. Early Token Release (ETR) is a function
                which allows a transmitting adapter to release a new token as
``` soon as it has completed frame transmission, whether or
not the header has returned to the adapter. This
option is only supported on 16Mbps Token Ring networks.
Setting this attribute to enabled(1) on a 4Mbps network will
return invalidData error."
::= { oc62nnDMGTModEntry 14 } oc62nnDMGTModTRMonitorConten OBJECT-TYPE
    SYNTAX INTEGER {
        enabled(1),
        disabled(2)
        }
    ACCESS read-write
    STATUS mandatory
    DESCRIPTION
        "Indicates whether this module's TR adapter will participate in
        Active Monitor Contention."
    ::= { oc62nnDMGTModEntry 15 } oc62nnDMGTModTRInternalWrap OBJECT-TYPE
    SYNTAX INTEGER {
        enabled(1),
        disabled(2)
        }
    ACCESS read-write
    STATUS mandatory
    DESCRIPTION
        "Indicates whether this module's TR adapter will perform an
        Internal Wrap Test, which wraps data internal to the MPC
        (MAC Wrap)."
    ::= { oc62nnDMGTModEntry 16 } oc62nnDMGTModTRExternalWrap OBJECT-TYPE
    SYNTAX INTEGER {
        enabled(1),
        disabled(2)
        }
    ACCESS read-write
    STATUS mandatory
    DESCRIPTION
        "Indicates whether this module's TR adapter will perform an
        External Wrap Test. This test performs a lobe wrap out to the
        cable, but the adapter is not inserted (phantom not raised)."
    ::= { oc62nnDMGTModEntry 17 } oc62nnDMGTModIfIndex  OBJECT-TYPE
    SYNTAX INTEGER
    ACCESS read-only
    STATUS mandatory
    DESCRIPTION
        "The interface number associated with this module."
    ::= { oc62nnDMGTModEntry 18 } oc62nnDMGTModRMONStatsMode  OBJECT-TYPE
    SYNTAX INTEGER {
        enabled(1),
        disabled(2)
        }
    ACCESS read-write
    STATUS mandatory

```
        DESCRIPTION                desired          N Probe
                "The des    t state of the TRMAC RMON  probe. When this
                 attribute is set to enabled the RMON probe will be
                 enabled and RMON statistics will be gathered for
                 RMON groups which are enabled."
        ::= { oc62nnDMGTModEntry 19 } oc62nnDMGTModDot5StatsMode   OBJECT-TYPE
        SYNTAX INTEGER {
                enabled(1),
                disabled(2)
                }
        ACCESS read-write
        STATUS mandatory
        DESCRIPTION
                "The desired IEEE 802.5 statistics mode of this card.
                 When this attribute is set to enabled, the card will
                 gather IEEE 802.5 statistics. Note that when this
                 attribute is enabled, the accuracy of all statistics
                 may be impaired during peak loads."
        ::= { oc62nnDMGTModEntry 20 } oc62nnDMGTModRMONHostStatsMode   OBJECT-TYPE
        SYNTAX INTEGER {
                enabled(1),
                disabled(2)
                }
        ACCESS read-write
        STATUS mandatory
        DESCRIPTION
                "The desired RMON host table statistics mode of this card.
                 When this attribute is set to enabled, the card will
                 gather RMON host table statistics. Note that when this
                 attribute is enabled, the accuracy of all statistics
                 may be impaired during peak loads."
        ::= { oc62nnDMGTModEntry 21 } oc62nnDMGTModRMONRingStationStatsMode   OBJECT-TYPE
        SYNTAX INTEGER {
                enabled(1),
                disabled(2)
                }
        ACCESS read-write
        STATUS mandatory
        DESCRIPTION
                "The desired RMON ring station table statistics mode
                 of this card. When this attribute is set to enabled,
                 the card will gather RMON ring station table statistics
                 and RMON ring station order table data. Note that when this
                 attribute is enabled, the accuracy of all statistics
                 may be impaired during peak loads."
        ::= { oc62nnDMGTModEntry 22 } oc62nnDMGTModRMONMLStatsMode   OBJECT-TYPE
        SYNTAX INTEGER {
                enabled(1),
                disabled(2)
                }
        ACCESS read-write
        STATUS mandatory
```

DESCRIPTION
        "The desired RMON mac-layer table statistics mode of this
        card. When this attribute is set to enabled, the card will
        gather RMON mac-layer table statistics. Note that when
        this attribute is enabled, the accuracy of all statistics
        may be impaired during peak loads."
::= { oc62nnDMGTModEntry 23 } oc62nnDMGTModRMONPStatsMode    OBJECT-TYPE
        SYNTAX INTEGER {
                enabled(1),
                disabled(2)
                }
        ACCESS read-write
        STATUS mandatory
        DESCRIPTION
                "The desired RMON promiscuous table statistics mode of this
                card. When this attribute is set to enabled, the card will
                gather RMON promiscuous table statistics. Note that when
                this attribute is enabled, the accuracy of all statistics
                may be impaired during peak loads."
        ::= { oc62nnDMGTModEntry 24 } oc62nnDMGTModRMONSrcRoutingStatsMode    OBJECT-TYPE
        SYNTAX INTEGER {
                enabled(1),
                disabled(2)
                }
        ACCESS read-write
        STATUS mandatory
        DESCRIPTION
                "The desired RMON source routing table statistics mode of this
                card. When this attribute is set to enabled, the card will
                gather RMON source routing table statistics. Note that when
                this attribute is enabled, the accuracy of all statistics
                may be impaired during peak loads."
        ::= { oc62nnDMGTModEntry 25 } oc62nnDMGTModRMONSurrogateStatsMode    OBJECT-TYPE
        SYNTAX INTEGER {
                enabled(1),
                disabled(2)
                }
        ACCESS read-write
        STATUS mandatory
        DESCRIPTION
                "The desired state of the TRMAC Surrogate probe. When this
                attribute is set to enabled the Surrogate probe will be
                enabled and REM and CRS statistics will be gathered
                if they are enabled."
        ::= { oc62nnDMGTModEntry 26 } oc62nnDMGTModARPResolveMethod OBJECT-TYPE
    SYNTAX INTEGER {
            source-route(1),
            non-source-route(2)
            }
    ACCESS read-write

```
STATUS mandatory            ARP
DESCRIPTION
        "The desired ARP broadcast type for this card. When this
        attribute is set to source-route(1), all ARP requests will
        contain the Routing Information field in the MAC frame.
        If this attribute is set to non-source-route(2), all ARP
        requests will not include the Routing Information field
        in the MAC frame."
::= { oc62nnDMGTModEntry 27 }
```

What is claimed is:

1. A method for coding a communication between a workstation and a management agent in a computer network, the method comprising the steps of:

provioding a computer network with a plurality of workstations and a management agent for managing communication between said plurality of workstations, said management agent operating said computer network based on a plurality of variables stored in said management agent, each variable including a object identifier and a data portion, each object identifier including a prefix, a suffix and an attribute;

providing a plurality of containment groups, each containment group representing one type of prefix of said plurality of variables;

placing said data portion, said attribute and said suffix of each of said variables having identical prefixes into a respective containment group;

providing a plurality of block groups in each of said containment groups, each block group representing one type of suffix of said variables in a corresponding containment group;

in said each containment group, placing said data portion and said attribute of each of said variables having identical suffixes into a respective block group;

combining each of said data portions according to respective block and containment groups into a summary variable;

transmitting said summary variable to one of said workstations to monitor status of said management agent and status of said network.

2. A method in accordance with claim 1, wherein:
said data portions are combined into a sequence.

3. A method in accordance with claim 1, wherein:
said data portions are combined in an order comprising all data portions of one said block group after another said block group of one containment group until all of said data portions of said one containment group are included;
said data portions of remaining containment groups being combined in a manner similar to said combining in said one containment group.

4. A method in accordance with claim 3, wherein:
each of said combined data portions of each containment group are combined one after another into said summary variable.

5. A method in accordance with claim 1, wherein:
said summary variable is encoded using BER encoding to distinguish said prefixes, said suffixes, said attributes and said data portions.

6. A method in accordance with claim 1, wherein:
the communication and said variables are in accordance with SNMP (Simple Network Management Protocol) as defined by IETF standard RFC1157.

7. A method in accordance with claim 1, wherein:
said variables describe MIB (Management Information Base) objects using ASN.1 (Abstract Syntax Notation 1) as defined by ISO standard 8824 and CCITT standard X.208.

8. A method in accordance with claim 5, further comprising:
said workstation removing one of said data portions from a received summary variable and recreating a respective attribute, suffix and prefix for said one data portion from said indicators in said summary variable.

9. A method for encoding a plurality of SNMP (Simple Network Management Protocol) variables between a management agent and a workstation in a computer network, the method comprising the steps of:

providing a computer network with a plurality of workstations and a management agent for managing communication between said plurality of workstations, said management agent operating said computer network based on a plurality of variables stored in said management agent, each variable including a object identifier and a data portion, each object identifier including a prefix, a suffix and an attribute;

dividing the plurality of variables into a plurality of containment groups based on a prefix of an object identifier of each variable, said prefix of each variable in a containment group being identical;

dividing the plurality of variables in said each containment group into a plurality of block groups based on a suffix of the object identifier of said each variable, said suffix of each variable in a block group being identical;

creating a summary variable including said data portions of said variables formed into a sequence based on a respective attribute, a respective block group and a respective containment group;

transmitting said summary variable to one of said workstations to monitor status of said management agent and status of said network.

10. A method in accordance with claim 9, wherein:
said data portions are combined in said summary variable in an order comprising all data portions of one said block group after all data portions of another said block group of one said containment group until all of said data portions of said one containment group are included;
said data portions of remaining containment groups being combined in a manner similar to said combining in said one containment group.

11. A method in accordance with claim 10, wherein:
each of said combined data portions of each containment group are combined one after another into said summary variable.

12. A method in accordance with claim 11, wherein:
said summary variable is encoded using BER encoding to distinguish said prefixes, said suffixes, said attributes and said data portions.

13. A method in accordance with claim 9, wherein:
said SNMP variables are in accordance with IETF standard RFC1157.

14. A method in accordance with claim 9, wherein:
said variables describe MIB (Management Information Base) objects using ASN.1 (Abstract Syntax Notation 1) as defined by ISO standard 8824 and CCITT standard X.208.

15. A computer network comprising:
a plurality of workstations;
concentrator means for connecting said plurality of workstations together into a network;
management means for managing communication between said plurality of workstations, said management means managing said plurality of workstations based on a plurality of variables stored in said management means, each variable including a object identifier and a data portion, each object identifier including a prefix, a suffix and an attribute;
processor means for creating a summary variable from said data portions of said plurality of variables, said processor means placing all data portions of said variables having one of said prefixes and one of said suffixes adjacent each other in a part of said summary variable, said processor means repetitively placing all data portions of said variables having said one of said prefix and another one of said suffix adjacent each other and then adjacent a previous part of said summary variable until all of said data portions of said variables having said one prefix have been placed in said summary variable, said processor means transmits said summary variable to one of said workstations to monitor status of said management agent and status of said network.

16. An apparatus in accordance with claim 15, wherein:
said processor means repetitively places all data portions of said variables having another one of said prefixes in said summary variable in a manner similar to said one prefix.

17. An apparatus in accordance with claim 16, wherein:
said processor means places said data portions of each of said prefixes in separate groups which are adjacent each other in said summary variable.

18. An apparatus in accordance with claim 15, wherein:
said processor means encodes said summary variable using BER encoding to distinguish said prefixes, said suffixes, said attributes and said data portions.

19. An apparatus in accordance with claim 15, wherein:
said communication and said variables are in accordance with SNMP (Simple Network Management Protocol) as defined by IETF standard RFC1157.

20. An apparatus in accordance with claim 15, wherein:
said variables describe MIB (Management Information Base) objects using ASN.1 (Abstract Syntax Notation 1) as defined by ISO standard 8824 and CCTI standard X.208.

21. An apparatus in accordance with claim 17, further comprising:
decoding means for receiving and removing one of said data portions from said summary variable, said decoding means also recreating a respective attribute, suffix and prefix for said one data portion from said indicators in said summary variable.

22. An apparatus in accordance with claim 17, wherein:
said management means is positioned in said concentrator means;

said processor means is positioned in said management means;

said workstation including another processor means similar to said processor means, said another processor means decoding said summary variable.

* * * * *